United States Patent
Coulson

(10) Patent No.: US 7,916,817 B2
(45) Date of Patent: Mar. 29, 2011

(54) METHOD AND APPARATUS FOR IMPROVING THE PERFORMANCE OF PILOT SYMBOL ASSISTED RECEIVERS IN THE PRESENCE OF NARROWBAND INTERFERENCE

(75) Inventor: Alan James Coulson, Lower Hutt (NZ)

(73) Assignee: Industrial Research Limited, Parnell, Auckland (NZ)

( * ) Notice: Subject to any disclaimer, the term of this patent is extended or adjusted under 35 U.S.C. 154(b) by 1262 days.

(21) Appl. No.: 10/550,633

(22) PCT Filed: Mar. 25, 2004

(86) PCT No.: PCT/NZ2004/000060
§ 371 (c)(1),
(2), (4) Date: Jul. 12, 2006

(87) PCT Pub. No.: WO2004/086662
PCT Pub. Date: Oct. 7, 2004

(65) Prior Publication Data
US 2007/0057718 A1    Mar. 15, 2007

(30) Foreign Application Priority Data
Mar. 25, 2003   (NZ) .................................... 524929

(51) Int. Cl.
*H04B 1/10* (2006.01)
(52) U.S. Cl. ........ 375/350; 375/316; 375/136; 375/137; 375/147; 375/148; 375/150; 375/152; 375/229; 375/232; 375/346
(58) Field of Classification Search .................. 375/316, 375/136, 137, 147, 148, 150, 152, 229, 232, 375/346, 350
See application file for complete search history.

(56) References Cited

U.S. PATENT DOCUMENTS

| | | | | |
|---|---|---|---|---|
| 4,910,521 A | * | 3/1990 | Mellon | ........................... 342/45 |
| 5,192,918 A | * | 3/1993 | Sugiyama | ..................... 327/552 |
| 5,355,126 A | * | 10/1994 | Nelson et al. | ................ 340/7.25 |

(Continued)

FOREIGN PATENT DOCUMENTS

EP    0 721 264    7/1996

(Continued)

OTHER PUBLICATIONS

M.G. Amin et al., "Optimum Interference Excision in Spread Spectrum Communications Using Open-Loop Adaptive Filters," IEEE, v. 47, No. 7, Jul. 1999.

(Continued)

Primary Examiner — Chieh M Fan
Assistant Examiner — Siu M Lee
(74) Attorney, Agent, or Firm — Dann, Dorfman, Herrell and Skillman, P.C.

(57) ABSTRACT

A method for reducing interference from at least one narrowband interferer in a pilot symbol assisted receiver (10) includes the steps of; receiving a stream of received data, passing the stream of received data through an adaptive filter that reduces interference from any narrowband interferer, passing the filtered data through a correlator (7, 8) arranged to detect pilot symbols, when a pilot symbol is detected passing the stream of received data to a receiving apparatus without first passing the received data through the adaptive filter (3), and wherein the pilot symbol includes one or more repetitions of known data or pseudo noise.

20 Claims, 11 Drawing Sheets

U.S. PATENT DOCUMENTS

| | | | |
|---|---|---|---|
| 5,787,118 A * | 7/1998 | Ueda | 375/232 |
| 6,169,770 B1 * | 1/2001 | Henely | 375/317 |
| 6,400,781 B1 * | 6/2002 | Vandendorpe et al. | 375/350 |
| 6,590,833 B1 * | 7/2003 | Teller | 367/125 |
| 6,807,224 B1 * | 10/2004 | Takahashi et al. | 375/150 |
| 6,904,079 B2 * | 6/2005 | Hoffmann et al. | 375/145 |
| 2001/0033625 A1 * | 10/2001 | Ninomiya et al. | 375/316 |
| 2002/0094020 A1 * | 7/2002 | Yellin | 375/148 |
| 2002/0106018 A1 * | 8/2002 | D'Luna et al. | 375/240.01 |
| 2002/0173341 A1 * | 11/2002 | Abdelmonem et al. | 455/561 |
| 2002/0196876 A1 * | 12/2002 | Takada | 375/346 |
| 2003/0235254 A1 | 12/2003 | Fanson et al. | |
| 2004/0100939 A1 * | 5/2004 | Kriedte et al. | 370/347 |
| 2004/0109670 A1 * | 6/2004 | Kim et al. | 386/46 |
| 2004/0136478 A1 * | 7/2004 | Yu et al. | 375/343 |
| 2004/0198452 A1 * | 10/2004 | Roy | 455/562.1 |

FOREIGN PATENT DOCUMENTS

| | | |
|---|---|---|
| EP | 1 176 731 | 1/2002 |
| EP | 1 202 468 | 5/2002 |
| EP | 1 263 179 | 12/2002 |
| WO | WO 99/05815 | 2/1999 |
| WO | WO 02/23781 | 3/2002 |
| WO | WO 02/069515 | 9/2002 |
| WO | WO 02/101953 | 12/2002 |
| WO | WO 03/090422 | 10/2003 |

OTHER PUBLICATIONS

R. Nilsson et al., "A Narrow-Band Interference Canceller for OFDM-based Systems," 4th Euro. Personal Mobile Com. Conf., Feb. 2001.

G.J. Saulnier et al., "Performance of a Spread Spectrum OFDM System in a Dispersive Fading Channel with Interference," IEEE, 1998.

J.A. Young et al., "Performance Metrics for Windows Used in Real-Time DFT-Based Multiple-Tone Frequency Excision," IEEE, 1999.

S. Kapoor et al., "Interference Suppression in DMT Receivers Using Windowing," IEEE, 2000.

L.B. Milstein et al., "An Analysis of a Real-Time Transform Domain Filtering Digital Communication System-Part I: Narrow-Band Interference Rejection," IEEE, 1980.

S.D. Sandberg, "Adapted Demodulation for Spread-spectrum Receivers which Employ Transform-Domain Interference Excision," IEEE, 1995.

G. Carron et al., "Comparison of Two Modulation Techniques Using Frequency Domain Processing for In-House Networks," IEEE, 2001.

K. Witrisal, "Impact of DC-offsets and Carrier Feed-through on Correlation-based Frequency Synchronization for OFDM," 6th Intl. OFDM Workshop, 2001.

D. Gerakoulis et al., "An Interference Suppressing OFDM System for Wireless Communications," IEEE, 2002.

M. Kuhn et al., "Linear block codes for frequency selective PLC channels with colored noise and multiple narrowband interference," IEEE, 2002.

R.W. Lowdermilk et al., "Interference Mitigation in Orthogonal Frequency Division Multiplexing (OFDM)," IEEE, 1996.

J.G. Proakis, "Interference Suppression in Spread Spectrum Systems," IEEE, 1996.

T.K. Blankenship, "Design and Implementation of a Pilot Signal Scanning Reeiver for CDMA Personal Communication Services Systems," May 1998.

S.J. Howard, "Narrowband Interference Rejection Using Small FFT Block Sizes," IEEE, 1992.

* cited by examiner

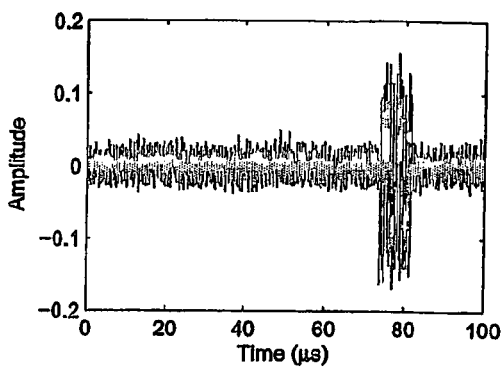
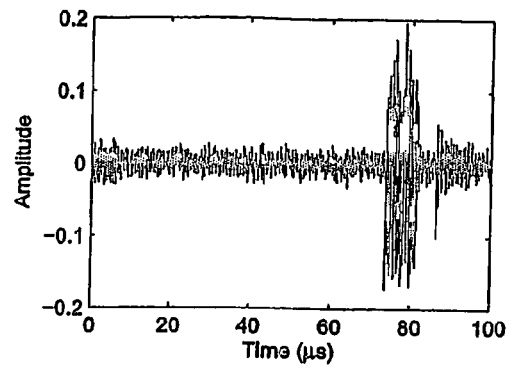
Figure 3A  Figure 3B
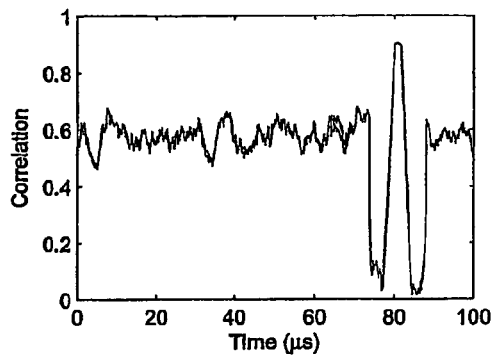
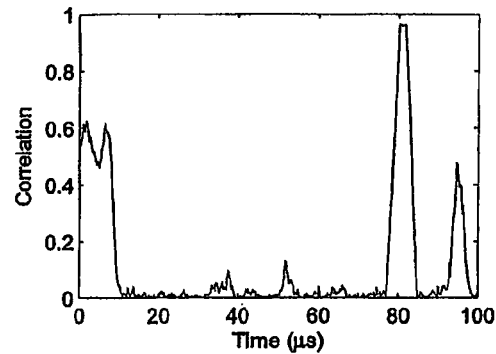
Figure 3C  Figure 3D
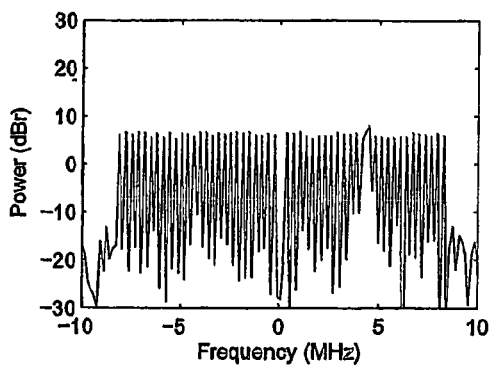
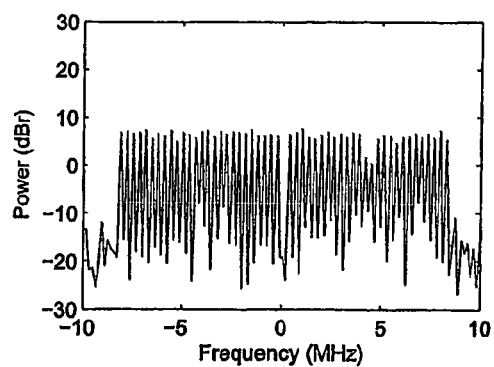
Figure 3E  Figure 3F

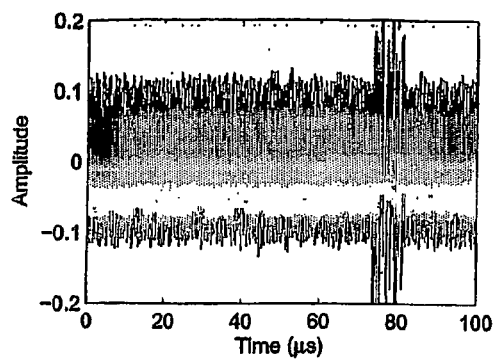 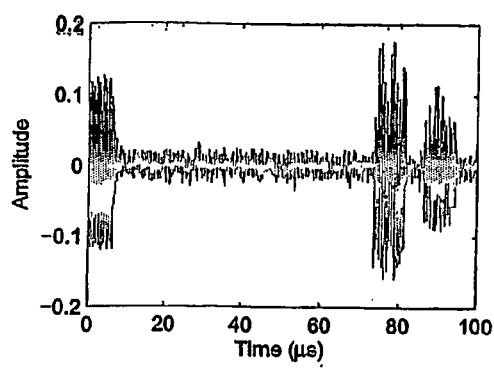
Figure 4A　　　　　　　　Figure 4B
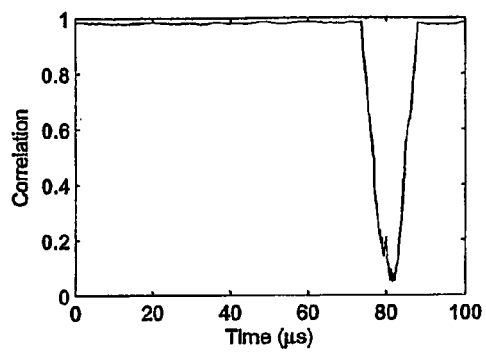 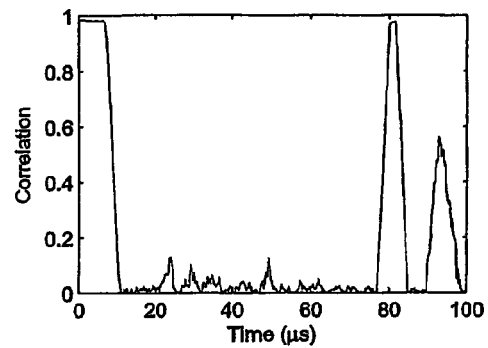
Figure 4C　　　　　　　　Figure 4D
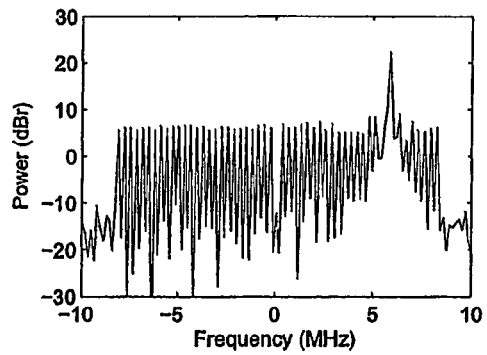 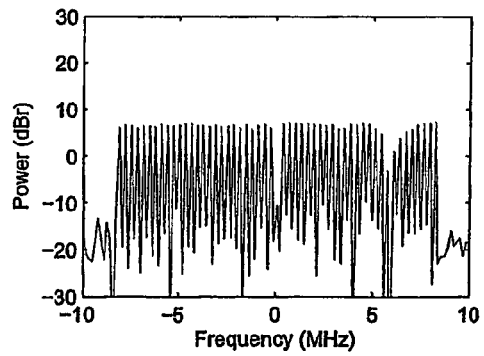
Figure 4E　　　　　　　　Figure 4F

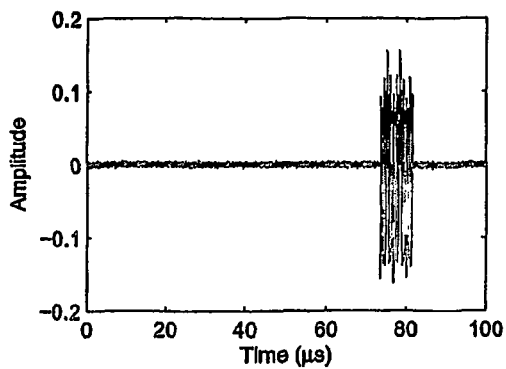
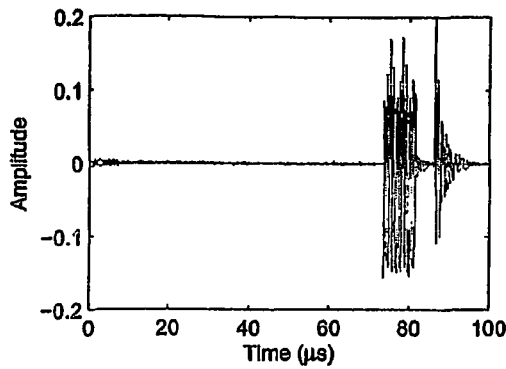
Figure 5A  Figure 5B
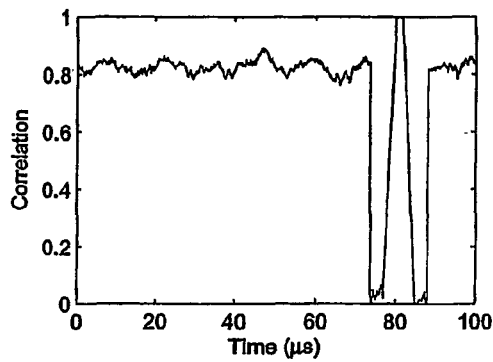
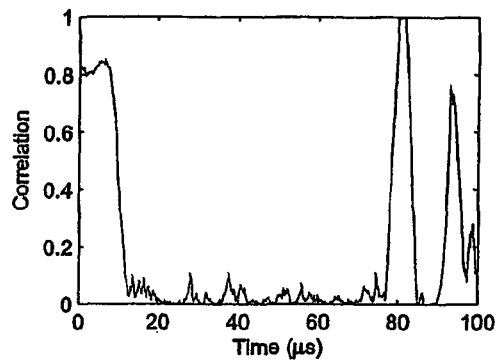
Figure 5C  Figure 5D
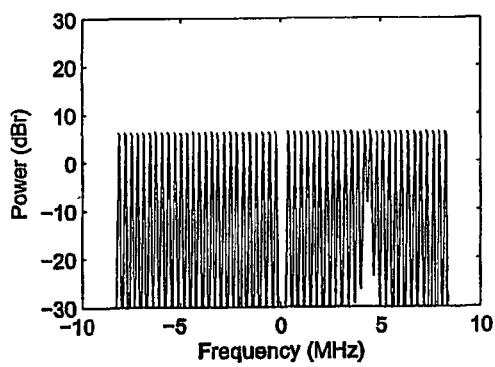
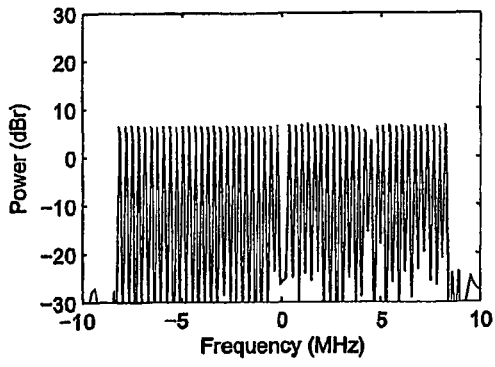
Figure 5E  Figure 5F

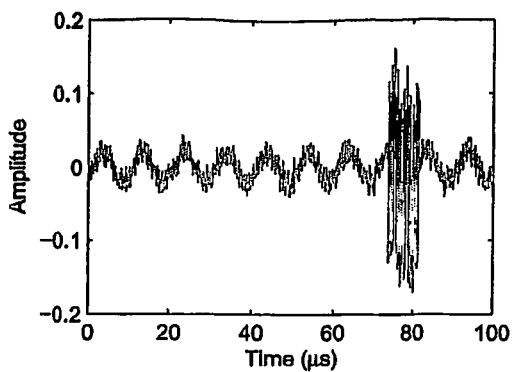 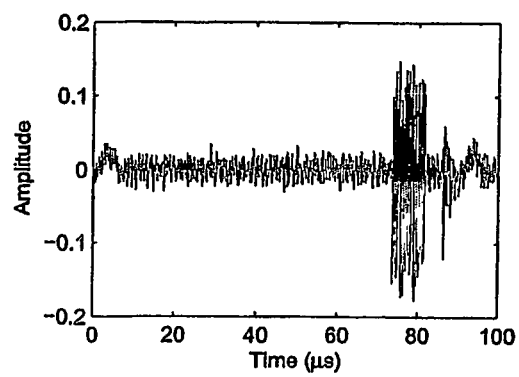
Figure 6A                    Figure 6B
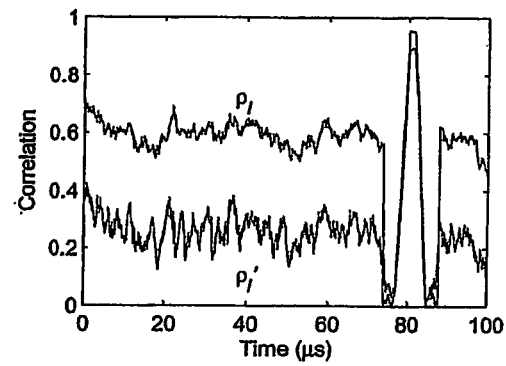 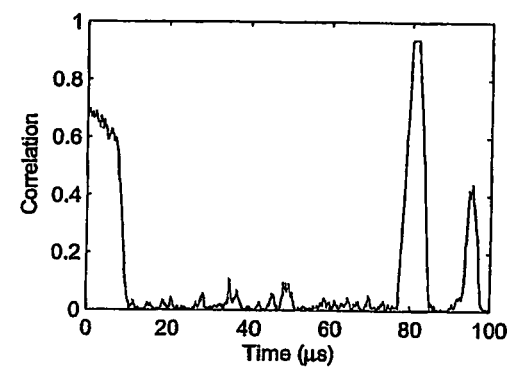
Figure 6C                    Figure 6D
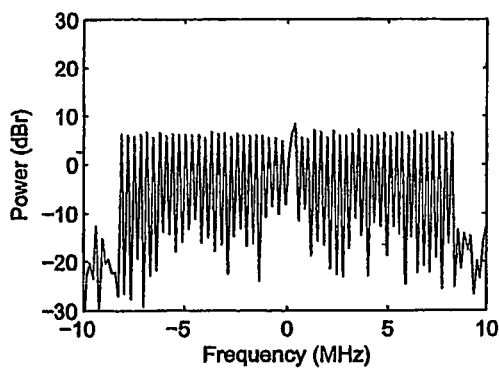 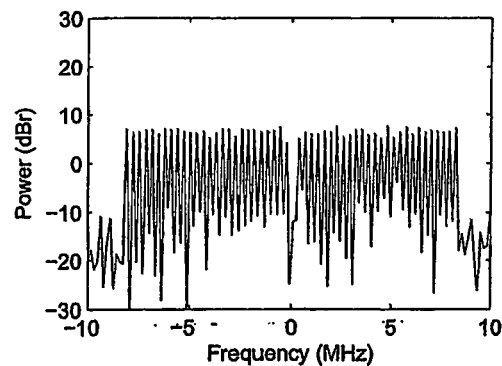
Figure 6E                    Figure 6F

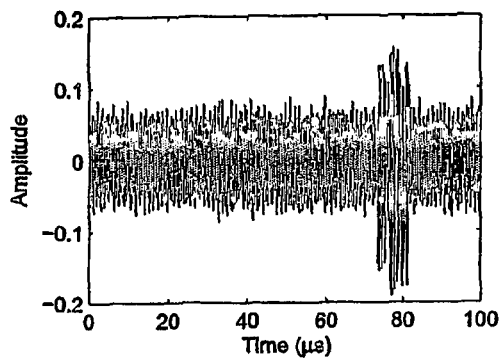
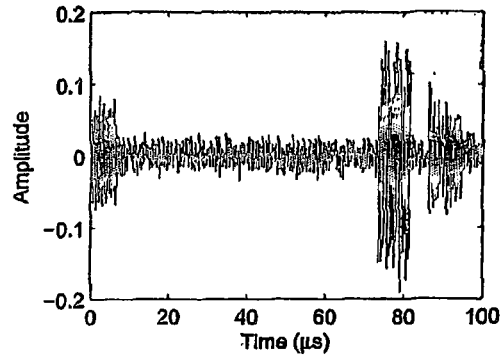
Figure 7A             Figure 7B
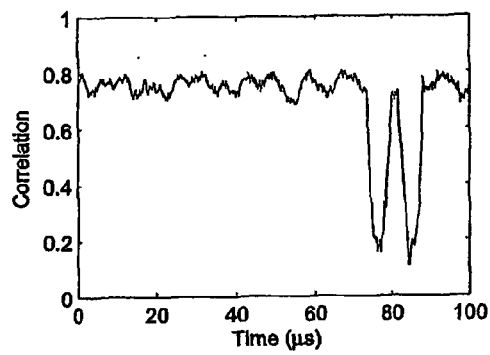
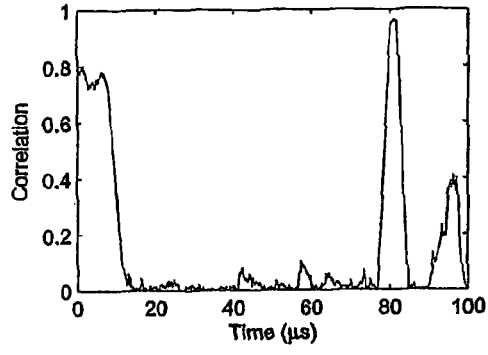
Figure 7C             Figure 7D
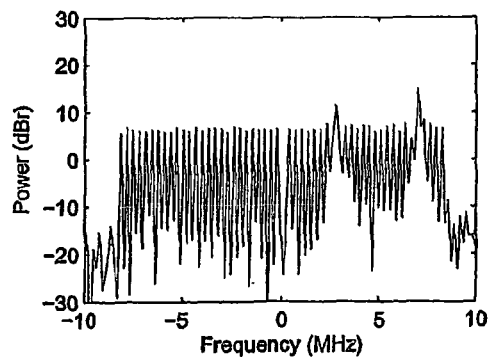
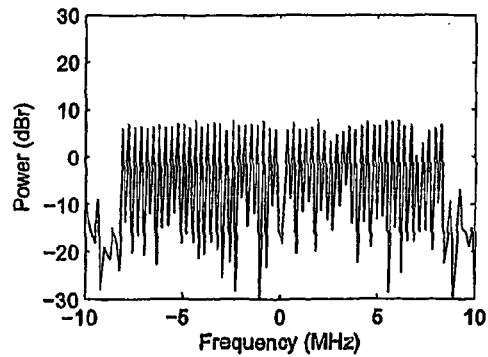
Figure 7E             Figure 7F

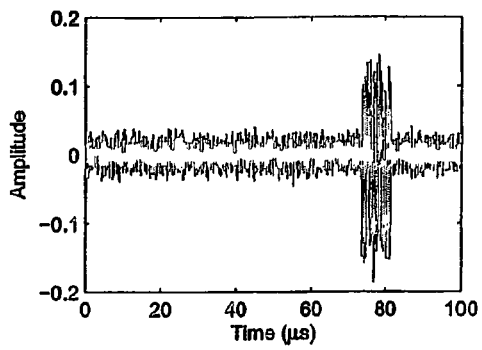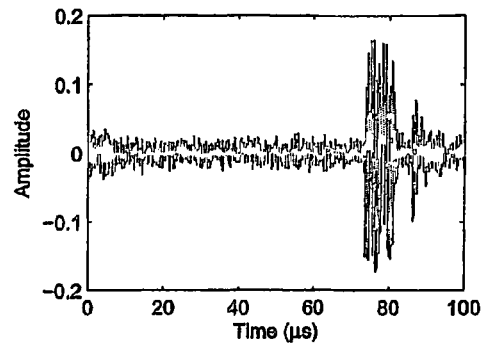
Figure 9A                Figure 9B
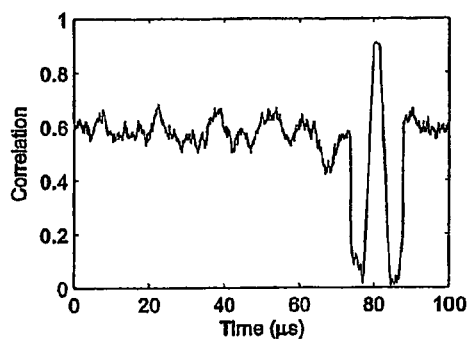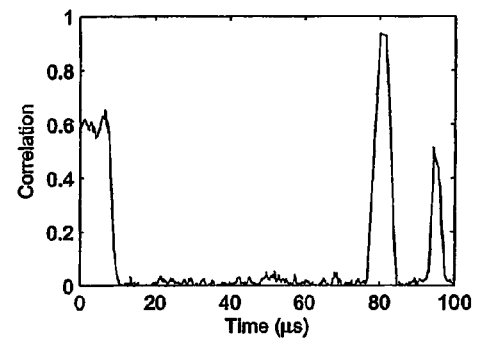
Figure 9C                Figure 9D
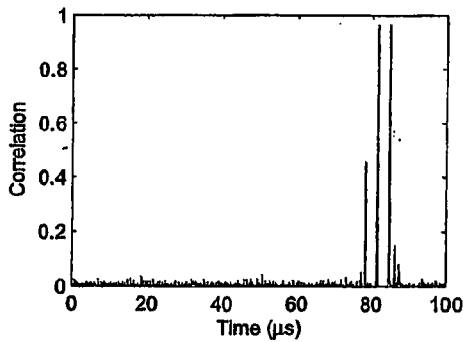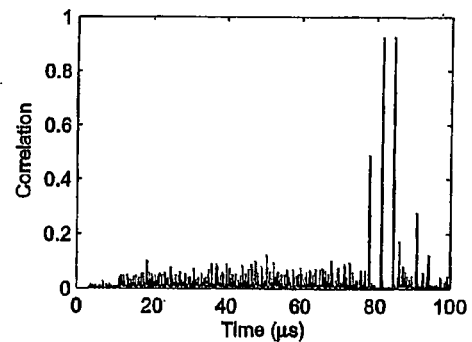
Figure 9E                Figure 9F

METHOD AND APPARATUS FOR IMPROVING THE PERFORMANCE OF PILOT SYMBOL ASSISTED RECEIVERS IN THE PRESENCE OF NARROWBAND INTERFERENCE

FIELD OF INVENTION

The invention relates to receivers for wireless communication and in particular to adaptive cancellation of narrowband interference in pilot symbol assisted receivers.

BACKGROUND

Many receivers are designed to detect signals with a pilot symbol. The pilot symbol may be one or more repetitions of a known data sequence or a pseudo-noise sequence. Detection of a pilot symbol indicates the presence of a data packet and also is used to determine the start of packet timing.

Orthogonal frequency division multiplexing (OFDM) has become the physical layer of choice for many wireless communications systems. Current wireless local area network (WLAN) and wireless metropolitan area network (WMAN) standards employ pilot symbols to aid detection and synchronization in the OFDM receiver. OFDM previously has been reported to be particularly sensitive to errors due to imperfect synchronization.

Pilot symbol assisted detection synchronization for OFDM relies on repeated pseudo-random binary sequences (PRBSs) being embedded in the pilot symbols, which are designed to have near-optimal unity peak to average power ratios (PAPRs) in both the time and frequency domain. Common approaches to pilot symbol assisted detection (and time offset estimation) are based on the correlation properties of the repeated PRBS in the pilot symbol. Similarly, the common approach to pilot symbol assisted synchronization (carrier frequency offset estimation) is based on exploiting the property that any frequency shift is common to the repeated PRBSs.

The susceptibility of pilot symbol assisted receivers to narrowband interference, with particular regard to OFDM systems is of particular importance as both WLAN and WMAN systems currently operate in unlicensed spectrum and therefore must co-exist with other unlicensed systems including cordless telephones, garage door openers, baby monitors and microwave ovens. All of these devices produce narrowband interference. Further, radio non-idealities such as transmitter carrier feedthrough (also known as carrier leakage) also introduce narrowband interference in the form of single-tone carrier residues. Previous work has proposed interference suppression using pre-coding. As well as this post-detection receiver techniques involving equalizers to improve bit error rate performance have been proposed.

A common model for a received, baseband (low pass equivalent) OFDM symbol, sampled with period T, is $$r_n = as(nT - \tau_S)e^{-j[2\pi v(nT - \tau_S) + \theta]} + \eta(nT), \qquad (1)$$

where a is the flat fading channel amplitude, s(t) is the transmitted signal, n is the sample index, $\tau_S$, $v$ and $\theta$ are the time-, frequency- and phase-offsets between transmitter and receiver introduced by a combination of system non-idealities and channel distortions, and $\eta$ is complex additive white Gaussian noise (AWGN) having variance $\sigma_w^2$. This model requires a number of assumptions including that the multipath channel is frequency non-selective (flat) and that the multipath channel is non time-varying (static). As the focus is on pilot symbol detection and frequency offset estimation, which are insensitive to sub-sample timing, the simplification $\tau_S = 0$ is made here without loss of generality.

Consideration of narrowband interference using this model produces $$r_n = as(nT)e^{-j[2\pi v n T + \theta]} + be^{-j[2\pi \xi n T + \phi]} + \eta(nT), \qquad (2)$$

where b, $\xi$ and $\phi$ are, respectively, the amplitude, frequency and phase of the demodulated narrowband interferer. Carrier feedthrough in the transmitter produces an in-band interferer at a frequency equal to the frequency difference between transmitter and receiver local oscillators which, depending on the amount of Doppler shift, will be equal or close to the signal frequency offset v. Typically, the maximum carrier frequency offset is much less than the OFDM sub-carrier spacing and the pilot symbol is designed specifically to be able to resolve this frequency without ambiguity. Any DC offset will occur at $\xi = 0$ and interference from other users of license-free spectrum may occur either singly (e.g. garage door openers, baby monitors, microwave ovens) or in pairs (e.g. cordless telephones) at any in-band frequency.

Pilot symbols for OFDM WLAN and WMAN standards comprise at least two repeated PRBSs, where each PRBS is of length L samples. While different receiver techniques are required for pilot symbol assisted detection and synchronization, depending on the number of PRBSs (including combinations of short and long PRBSs), all algorithms are based on the correlation properties between the repeated sequences. Alternatively if the pilot symbol contains a sequence known by the receiver, the algorithms can be based on the correlation properties between the pilot symbol and known sequence.

The lth output sample of an L-length sliding window integrate-and-dump cross-correlator of the received signal is $$P_l \doteq r_l^H r_{l+L}, \qquad (3)$$

where $r \doteq [r_l, r_{l+1}, \ldots, r_{l+L-1}]^T$ and $[.]^H$ denotes Hermitian transpose. For a packet consisting of a pilot symbol preceded (l<0) and followed (l>2L−1) by noise only, analyses of the output of the correlator, $P_l$, in an interference-free environment show that $|P_l|$ rises steeply to a peak (at l=0) before falling steeply to the noise-only level. Further, normalising $|P_l|$ produces the non-central correlation coefficient $$|\rho_l| \doteq \frac{|P_l|}{\sqrt{R_l R_{l+L}}} \qquad (4)$$

where $$R_l \doteq r_l^H r_l \qquad (5)$$

and the range of $|\rho_l|$ is constrained to [0 1]. The receiver will declare a pilot symbol detection at the point where some threshold of correlation, $T_C$, is exceeded, that is when $$|\rho_l| > T_C. \qquad (6)$$

Detection becomes more complicated where pilot symbols comprise more than two PRBSs, include a cyclic prefix (guard interval) and apply matched filter techniques to increase timing resolution and minimise false detection probability. However, the comparison specified by equation (6) is fundamental in every case.

In an environment with a narrowband interferer substitution of equation (2) into equation (3) yields $$P_l = La^2S^2 e^{-j2\pi vLT} + Lb^2 e^{-j2\pi\xi LT} + \quad (7)$$
$$LaSb[e^{-j2\pi vLT}\Xi_l(v-\xi) + e^{-j2\pi\xi LT}\Xi_l^*(v-\xi)] +$$
$$\eta_l^H(as_{l+L} + b\xi_{l+L}) + (as_l^H + b\xi_l^H)\eta_{l+L} + \eta_l^H \eta_{l+L},$$

where $$\Xi_l(x) \doteq e^{-j[2\pi xlT+\theta-\phi]}\Phi(x)$$

for $$\Phi(x) \doteq \frac{1}{SL}\sum_{m=0}^{L-1} s_{l+m} e^{-j2\pi xmT},$$

$$s_l \doteq e^{-j[2\pi viT+\theta]}[s_l, s_{l+1}e^{-j2\pi vT}, \ldots, s_{l+L-1}e^{-j2\pi v(L-1)T}]^T,$$

$$\xi_l \doteq e^{-j[2\pi\xi T+\phi]}[1, e^{-j2\pi\xi T}, \ldots, e^{-j2\pi\xi(L-1)T}]^T$$

and S is the mean magnitude of the PRBS. Similarly, insertion of equation (2) into equation (5) yields $$R_l = La^2S^2 + Lb^2 + LaSb[\Xi_l(v-\xi) + \Xi_l^*(v-\xi)] + \quad (8)$$
$$\eta_l^H(as_l + b\xi_l) + (as_l^H + b\xi_l^H)\eta_l + \eta_l^H \eta_l.$$

In the absence of signal, that is, in a narrowband interferer plus noise only environment, the probability of false pilot symbol detection may be evaluated as follows: Simplification of equation (7) and equation (8) leads to the approximations $$P_l \approx \underbrace{Lb^2 e^{-j2\pi\xi LT}}_{\text{interference term}} + \underbrace{\sqrt{L(2b^2+\sigma_w^2)}\,\eta_l}_{\text{composite noise term}}, \quad (9)$$

and $$R_l \approx \underbrace{L(b^2+2\sigma_w^2)}_{\text{interference term}} + \underbrace{2\sqrt{L(b^2+\sigma_w^2)}\,\text{Re}\{\eta_l\}}_{\text{composite noise term}}, \quad (10)$$

respectively, where $\eta_l$ is a zero mean complex Gaussian random variable with variance $\sigma_w^2$. Details of the approximations may be inferred by reference to A. J. Coulson, "Maximum Likelihood Synchronization for OFDM Using a Pilot Symbol: Algorithms", IEEE J. Selected Areas in Communications, vol. 19, no. 12, pp 2486-2494, December 2001.

Evaluation of the false detection probability $p(|\rho_l|>T_C)\equiv p$ $(|P_l|^2-T_C^2 R_l^2 >0)$ in a narrowband interference-only environment may be found by comparison with expressions found in A. J. Coulson, "Maximum Likelihood Synchronization for OFDM Using a Pilot Symbol: Analysis", IEEE J. Selected Areas in Communications, vol. 19, no. 12, pp 2495-2503, December 2001. It is sufficient for the purposes here to examine $$\langle|\rho_l|\rangle = \frac{\langle|P_l|\rangle}{\sqrt{\langle R_l R_{l+L}\rangle}} \quad (11)$$
$$= \sqrt{\frac{\Gamma^2+1/L(2\Gamma+1)}{(\Gamma+1)^2+1/L(2\Gamma+1)}} \approx \frac{\Gamma}{\Gamma+1},$$

where <.> denotes the expected value, $\Gamma\doteq b^2/2\sigma_w^2$ is the interference to noise ratio, and noting that equation (11) is independent of the output of the cross-correlator 1 since both the magnitude of the narrowband interferer and the statistics of AWGN (additive white Gaussian noise) are time-invariant. The approximation is accurate for large values of L and for $\Gamma \neq 0$.

From equation (11) it is clear that the non-central correlation coefficient $|\rho_l|$ will approach any practical value of $T_C$, even at modest levels of interference. For example, the commonly-used value of $T_C^2=0.8$ will be exceeded, on average, by a narrowband interferer only 9 dB above the receiver noise floor. This means that a narrowband interferer will "swamp" a correlation-based detector based on equation (6), making it difficult to distinguish between the interference-only signal and an incoming pilot symbol, even though the pilot symbol may be tens of decibels greater in power than the interferer. More robust detection techniques, for example using a two-stage process employing a matched filter also will fail as a reasonably accurate forward estimate of frequency offset is required to produce the matched filter.

Frequency offset estimation is based on evaluating arg $(P_l)$. Frequency offset estimation in the presence of narrowband interference but absence of signal will produce only an estimate of the carrier frequency of the interferer, which win be aliased if the carrier frequency is greater than the pilot symbol PRBS period inverse. In the presence of both signal and interference, the frequency offset estimate has an expected value of $$\langle \hat{v} \rangle \doteq \frac{1}{2\pi LT}\langle \arg(P_0)\rangle \quad (12)$$
$$= \frac{1}{2\pi LT}\langle \arg(La^2S^2 e^{-j2\pi vLT} + Lb^2 e^{-j2\pi\xi LT} +$$
$$LaSb[e^{-j2\pi vLT}\Xi_l(v-\xi) + e^{-j2\pi\xi LT}\Xi_l^*(v-\xi)])|_{l=0}\rangle$$

After some manipulations, the frequency offset estimation bias can be shown to have an expected value of $$\phi_{bias} \doteq \langle\hat{v}\rangle - v \quad (13)$$
$$= \frac{1}{2\pi LT}a\tan\left(\frac{\sin[2\pi(v-\xi)LT]+\frac{2\iota XY\sin[\pi(v-\xi)LT]}{\iota^2+\cos[2\pi(v-\xi)LT]+}}{2\iota XY\cos[\pi(v-\xi)LT]}\right)$$

where $\iota\doteq aS/b$ is the signal-to-interferer ratio, $X\doteq|\Phi(v-\xi)|$, $\chi\doteq\arg(\Phi(v-\xi))$ and $Y\doteq\cos[\theta-\phi+\chi+\pi(v-\xi)LT]$.

Clearly, the value of this bias significantly depends on the difference between the pilot symbol frequency offset and the interferer carrier frequency $(v-\xi)$, the signal-to-interferer ratio, $\iota$, and the properties of the PRBS, manifested through $\Phi(v-\xi)$. Of primary importance is that the bias depends on the difference $v-\xi$, rather than the frequency offset, $v$, itself. Thus, for an interferer having a large carrier frequency $\xi$, the estimation bias $\phi_{bias}$ can significantly exceed $v$ itself even for a large signal-to-interference ratio, as illustrated in FIG. 1.

An alternative "detection metric" to that of equation (4) has been proposed. This is the central correlation coefficient $$|\rho_l'| \doteq \frac{|P_l'|}{\sqrt{R_l' R_{l+L}'}} \quad (14)$$

where $$P_l' \doteq (r_l^H - \bar{r}_l^*)(r_{l+L} - \bar{r}_{l+L}) \quad (15)$$
$$= r_l^H r_{l+L} - L\bar{r}_l^* \bar{r}_{l+L}$$

for $\bar{r}_l \doteq \frac{1}{L} \sum_{m=0}^{L-1} r_{l+m}$ and $$R_l' \doteq r_l^H r_l - L\bar{r}_l^* \bar{r}_l \quad (16)$$

noting that, in contrast with normal practice, •' is used here to denote central moments and central random variables to maintain consistency with previously used notation. Intuitively, it is expected that the central correlation "detection metric" of equation (14) is more robust than the traditional non-central correlation coefficient of equation (4) in the presence of a near DC narrowband interferer.

In a narrowband interference-only environment, by inserting equations (7) and (8) into equations (15) and (16), and then into equation (14), the expected value of $|\rho_l'|$ can be shown to be $$\langle |\rho_l'| \rangle = \frac{\langle |P_l'| \rangle}{\langle \sqrt{R_l' R_{l+L}'} \rangle} \quad (17)$$
$$= \sqrt{\frac{\tilde{\Gamma}^2 + 1/L(2\tilde{\Gamma} + 1)}{(\tilde{\Gamma} + 1)^2 + 1/L(2\tilde{\Gamma} + 1)}} \approx \frac{\tilde{\Gamma}}{\tilde{\Gamma} + 1},$$

where $\tilde{\Gamma} \doteq (1-|\Psi(\xi)|^2)b^2/2\sigma_w^2$ is the modified interference to noise ratio for $$\Psi(\xi) \doteq e^{j\pi\xi(L-1)T} \frac{\sin\pi\xi LT}{L\sin\pi\xi T},$$

and the approximation is accurate for large values of L and for $\tilde{\Gamma} \neq 0$. Note that, as with $\neq |\rho_l| \neq$, $\neq |\rho_l'| \neq$ is independent of l in the absence of a signal.

The mean improvement in interference rejection gained through the use of $|\rho_l'|$ over the use of $|\rho_l|$ is shown in FIG. 2 as a function of the narrowband interferer carrier frequency $\xi$ normalised to the OFDM sub-carrier spacing 1/(LT). Also shown on FIG. 2, for reference, are the frequency responses of high pass filters of increasing order and the maximum carrier frequency offset specified by the IEEE 802.11a standard.

This Figure shows, firstly, that the DC offset rejection gained through the use of equation (14) in place of equation (4) is substantial. Secondly, the frequency response of the improvement in narrowband interference rejection gained through the use of equation (14) in place of equation (4) is very similar to that of a first order filter with a cut-off (3 dB) frequency of about ½ξLT such as may be implemented, for example, using a coupling capacitor on the input to the analog-to-digital converter. Thirdly, the interference rejection at the maximum expected frequency offset for IEEE 802.11a is less than one decibel. IEEE Standard 802.11a-1999, Part 11: Wireless LAN Medium Access Control (MAC), and Physical Layer (PHY) Specifications—High-speed Physical Layer in the 5 GHz Band, 1999 is incorporated herein by reference. Referring to the IEEE 802.11a standard, for a maximum input signal level of −30 dBm (17.10.3.4) and a maximum carrier leakage of −15 dBr (17.3.9.6.1), the additional carrier leakage attenuation required at the receiver to suppress the maximum received carrier level below the minimum receiver sensitivity of −82 dBm (17.3.10.1) is 37 dB. From FIG. 2, a tenth order high pass filter does not provide this attenuation across the range of allowable carrier frequency offsets, which means that the only practical reliable method of preventing carrier leakage from producing false detection correlations is accurate time-gating at the transmitter.

Further, a receiver having a dynamic range of 50 dB must be able to suppress narrowband interferers at any in-band frequency by at least 50 dB to prevent false detection correlations. Clearly, the use of central correlation alone does not achieve this.

As described above neither the non-central correlation coefficient pi nor the central correlation coefficient $\rho_l'$ by themselves are sufficient to detect a pilot symbol in the presence of narrowband interference without additional processing.

SUMMARY OF INVENTION

It is the object of the invention to provide a pilot symbol assisted receiver that reduces interference from a narrowband interferer or to at least provide the public with a useful choice.

In broad terms in one aspect the invention comprises a method for reducing interference from at least one narrow band interferer in a pilot symbol assisted receiver including the steps of; receiving a stream of received data, passing the stream of received data through an adaptive filter that reduces interference from any narrowband interferer, passing the filtered data through a correlator arranged to detect pilot symbols, when a pilot symbol is detected passing the stream of received data to a receiving apparatus without first passing the received data through the adaptive filter, and wherein the pilot symbol includes one or more repetitions of known data or pseudo noise.

Preferably the number of taps in the adaptive filter is greater than the maximum number of interferes to be cancelled. Ideally the minimum number of taps in the adaptive filter is one greater than the maximum number of interferers to be cancelled.

Preferably the adaptive filter is a normalised least means squares (N-LMS) filter.

Preferably the adaptive filter uses a delayed stream of the received data as a reference signal. Ideally the length of the delay is longer than the length of the pilot symbol.

Preferably the step of detecting a pilot symbol in the correlator includes the steps of detecting a peak in a sliding correlator and when the peak is detected in the sliding correlator operating a pilot symbol detector to detect the pilot symbol. In one embodiment the step of detecting a pilot symbol further includes the step of timing out if a pilot symbol is not detected by the pilot symbol detector within a predetermined number of operations.

As a result of frequency offset estimation bias due to a narrowband interferer, in preferred embodiments the effect of main concern here is on detection methods employing a matched filter. These methods require accurate frequency offset estimation in order to be able to produce the matched filter. Significant frequency estimation bias renders matched filter detection methods ineffective. Further, even if detection is obtained, significant frequency offset estimation bias results in significant frequency offset in the OFDM data, which increases the bit error rate.

In broad terms in another aspect the invention comprises a method for detecting a pilot symbol in the presence of narrowband interference using a receiver including the steps of; receiving a stream of received data, passing the stream of received data through an adaptive filter to reduce interference from any narrowband interferers, passing the output of the adaptive filter to a correlator, when the correlator produces a peak over a threshold value triggering a pilot symbol detector to search for a pilot symbol in the filtered data, triggering a timeout during which the pilot symbol detector will not operate if the pilot symbol detector does not detect a pilot symbol in the filtered data without a predetermined number of operations, and sending a signal that triggers removal of the adaptive filter from the receiver path if the pilot symbol detector detects a pilot symbol in the filtered data within the predetermined number of second correlator operations, and wherein the pilot symbol includes one or more repetitions of known data or pseudo noise sequence.

Preferably the correlator is a sliding window correlator.

Preferably the pilot symbol detector is a matched filter correlator.

In broad terms in another aspect the invention comprises a narrowband interference reducing system for a receiver including; a front end arranged to receive data, an adaptive filter arranged to filter narrowband interference from the received data and provide filtered data, a correlator arranged to detect pilot symbols in the filtered data, and a logic system arranged to reroute the received data to a receiving apparatus when a pilot symbol has been detected, and wherein the pilot symbol includes one or more repetitions of known data or pseudo noise sequence.

It is noted that, at the time of writing, anecdotal evidence suggests a much higher likelihood of interference in the 2.4 GHz ISM band than in the 5 GHz band. The principal immediate application of this invention may be to IEEE 802.11g-compliant WLANs.

The following description concentrates on examining the effect of narrowband interference on the fundamental building block of one L-length PRBS repeated once and with no guard interval or cyclic prefix: the effect on more complicated pilot symbols may be inferred directly from this analysis.

BRIEF DESCRIPTION OF DRAWINGS

The narrowband interference system and method for pilot symbol assisted receivers of the invention will be further described by way of example only and without intending to be limiting with reference to the following drawings, wherein:

FIG. 3A shows the pilot symbol with one narrowband interferer;

FIG. 3B shows the pilot symbol and narrowband interferer after filtering with an N-LMS filter;

FIG. 3C shows the change in correlation coefficient over time for the signal of FIG. 3A;

FIG. 3D shows the change in correlation coefficient over time for the signal of FIG. 3B;

FIG. 3E is the spectrum of the last 128 samples of the received pilot symbol of FIG. 3A;

FIG. 3F is the spectrum of the last 128 samples of the received pilot symbol of FIG. 3B;

FIG. 4A shows the pilot symbol with one narrowband interferer;

FIG. 4B shows the pilot symbol and narrowband interferer after filtering with an N-LMS filter;

FIG. 4C shows the change in correlation coefficient over time for the signal of FIG. 4A;

FIG. 4D shows the change in correlation coefficient over time for the signal of FIG. 4B;

FIG. 4E is the spectrum of the last 128 samples of the received pilot symbol of FIG. 4A;

FIG. 4F is the spectrum of the last 128 samples of the received pilot symbol of FIG. 4B;

FIG. 5A shows the pilot symbol with one narrowband interferer;

FIG. 5B shows the pilot symbol and narrowband interferer after filtering with an N-LMS filter;

FIG. 5C shows the change in correlation coefficient over time for the signal of FIG. 5A;

FIG. 5D shows the change in correlation coefficient over time for the signal of FIG. 5B;

FIG. 5E is the spectrum of the last 128 samples of the received pilot symbol of FIG. 5A;

FIG. 5F is the spectrum of the last 128 samples of the received pilot symbol of FIG. 5B;

FIG. 6A shows the pilot symbol with one narrowband interferer;

FIG. 6B shows the pilot symbol and narrowband interferer after filtering with an N-LMS filter;

FIG. 6C shows the change in correlation coefficient over time for the signal of FIG. 6A;

FIG. 6D shows the change in correlation coefficient over time for the signal of FIG. 6B;

FIG. 6E is the spectrum of the last 128 samples of the received pilot symbol of FIG. 6A;

FIG. 6F is the spectrum of the last 128 samples of the received pilot symbol of FIG. 6B;

FIG. 7A shows the pilot symbol with two narrowband interferers;

FIG. 7B shows the pilot symbol and narrowband interferers after filtering with an N-LMS filter;

FIG. 7C shows the change in correlation coefficient over time for the signal of FIG. 7A;

FIG. 7D shows the change in correlation coefficient over time for the signal of FIG. 7B;

FIG. 7E is the spectrum of the last 128 samples of the received pilot symbol of FIG. 7A;

FIG. 7F is the spectrum of the last 128 samples of the received pilot symbol of FIG. 7B;

FIG. 9A shows the pilot symbol with one narrowband interferer;

FIG. 9B shows the pilot symbol and narrowband interferer after filtering with an N-LMS filter;

FIG. 9C shows the change in correlation coefficient over time for the signal of FIG. 9A;

FIG. 9D shows the change in correlation coefficient over time for the signal of FIG. 9B;

FIG. 9E is the matched filter correlation function of the received pilot symbol of FIG. 9A;

FIG. 9F is the matched filter correlation function of the received pilot symbol of FIG. 9B;

DETAILED DESCRIPTION

Figure 1A:
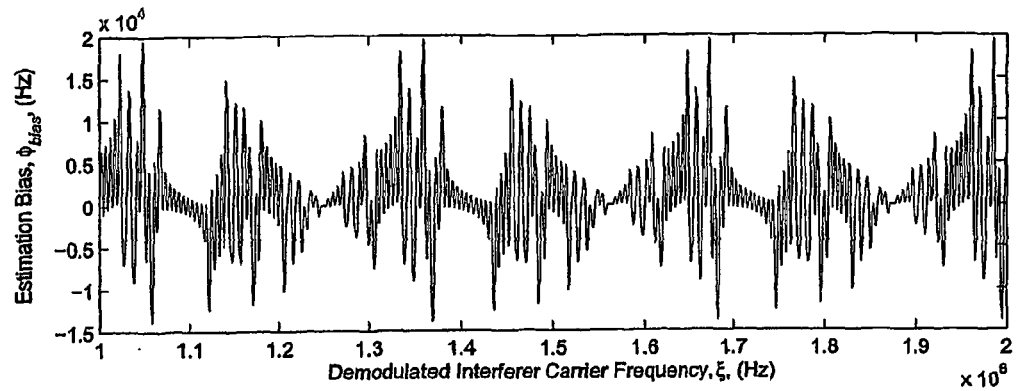
FIG. 1A shows the frequency offset estimation bias produced by a single narrowband interferer where the signal to interference ratio is 20 dB.
Figure 1B:
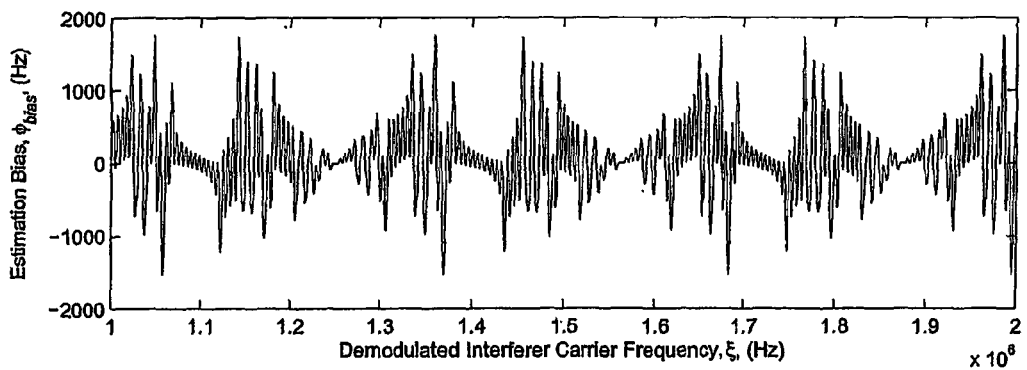
FIG. 1B shows the frequency offset estimation bias produced by a single narrowband interfered where the signal to interference ratio is 40 dB.

Effective narrowband interference suppression can be used to improve the reliability of pilot symbol assisted receivers that use correlators to detect the pilot symbol. These types of receivers can include OFDM receivers, xDSL receivers, and single carrier modulation QAM receivers. The pilot symbol includes one or more repetitions of known data or pseudo noise sequence. Adaptive filters can be used to provide interference suppression. In preferred embodiments the adaptive filter is a normalised least mean squares (N-LMS) algorithm that is able to be applied to suppress narrowband interference, as follows.

An M length finite impulse response (FIR) having a time-varying coefficient vector $w_m \doteq [w_m, w_{m+1}, \ldots, w_{m+M-1}]^T$ is innovated using the update equation $$w_{m+1} = w_m + \frac{\mu}{\delta_\mu + \|u_m\|^2} u_m e_m^*, \qquad (18)$$

where $u_m$ is a sample vector of reference signal, $\mu$ is an adaptation coefficient, $\delta_\mu$ is a small positive constant, $\|.\|$ denotes the Euclidean norm and $$e_m = r_m - y_m \qquad (19)$$

is the system output and estimation error for filter output $$y_m = w_m^H u_m, \qquad (20)$$

noting that $r_m$, as described previously, is the mth sample of receiver (baseband) input.

In alternative embodiments other types of adaptive filter may be used.

Ideally, the reference signal comprises interference, which is correlated with the interference in the input signal, and desired signal and noise which are uncorrelated with desired signal and noise in the input signal. One way to achieve this is to produce the reference signal as a time-lagged version of the input signal, such that $u_m = r_{m+K}$ for lag K and where K is chosen to be larger than the length of the pilot symbol.

This implementation of the LMS algorithm is capable of robustly suppressing multiple narrowband interferers. A useful rule of thumb is that an M coefficient N-LMS filter can suppress M−1 narrowband interferers. Therefore to cancel M interferers an adaptive filter with at least M+1 taps is required. More taps than this can be used.

Table 1 shows the computational complexity of the normalised least mean squares (N-LMS) algorithm for an M-tap filter compared to that of the LMS algorithm. The estimated total number of cycles assumes that six cycles are required to implement each division. Note that, although the N-LMS is more than thrice as computationally expensive as the LMS, the additional robustness provided by the N-LMS to gradient noise amplification more than justifies the additional complexity.

TABLE 1

|  | M Taps | M = 3 | M = 4 |
|---|---|---|---|
| N-LMS | 18M + 4 MULT | 58 MULT | 76 MULT |
|  | 13M + 4 ADD | 43 ADD | 56 ADD |
|  | 2M DIV | 6 DIV | 8 DIV |
|  | 30M + 4 Cycles | 94 Cycles | 124 Cycles |
| LMS | 8M + 4 MULT | 28 MULT | 36 MULT |
|  | 8M + 2 ADD | 26 ADD | 34 ADD |
|  | 8M + 4 Cycles | 28 Cycles | 36 Cycles |

EXAMPLES

Pilot symbol detection in the presence of narrowband interference was simulated to confirm the efficacy of interference cancellation based on the N-LMS algorithm and to identify implementation issues associated with a practical receiver.

The following examples all relate to detecting symbols in the presence of narrowband interferers in OFDM receivers. This should not be seen as limiting as the invention applies to any digital modulation receiver designed for a transmitter that transmits a pilot symbol including one or more repetitions of known data or pseudo-noise sequence in each data packet. Such digital modulation receivers include OFDM, xDSL, and single QAM systems.

To demonstrate the effect of narrowband interference on pilot symbol based receivers, and to establish the efficacy of the N-LMS algorithm in suppressing the effects of narrowband interference, the following simulations were performed. The IEEE 802.11a long pilot symbol was transmitted, both preceded and succeeded by AWGN. One or more narrowband interferers were added to the transmitted signal. One receiver chain had no interference suppression and performed pilot symbol based detection by calculating the non-central correlation function of equation (4) and the central correlation function of equation (14). The second receiver chain performed the N-LMS algorithm at the input, followed by pilot symbol detection using the non-central correlation function of equation (4). IEEE 802.11a system parameters were used, so the length of one PRBS in the pilot symbol L=64 and T=50 ns. For all simulations, the number of N-LMS filter taps used was M=3, the lag (delay) between the primary input and the reference input was K(=4×L)=256 taps, the adaptation coefficient $\mu$=0.1 and constant $\delta_\mu$=0.0001. These simulations assume an ideal implementation with no carrier frequency or phase offset and no sample timing offset.

As will be seen in the examples there is a need to remove the adaptive filter from the receiver path once a pilot symbol has been detected. One method for determining when to remove the N-LMS filter from the receiver chain requires a two-stage detection process. The output from the sliding window correlator is compared to a threshold of detection, set at a level to minimise the probability of false detection while also minimising the probability of missed detection, as described in A. J. Coulson, "Maximum Likelihood Synchronization for OFDM Using a Pilot Symbol: Analysis", IEEE J. Selected Areas in Communications, vol. 19, no. 12, pp 2495-2503, December 2001. Once this threshold has been exceeded a second, detector (in the examples a matched filter) is enabled. The matched filter detector, although computationally expensive, is exercised only for a few sample periods and produces excellent localisation and interference immunity. For application to interference suppression, the matched filter "peak" can be used to determine when to switch the N-LMS filter out of the receiver chain.

Figure 10A:
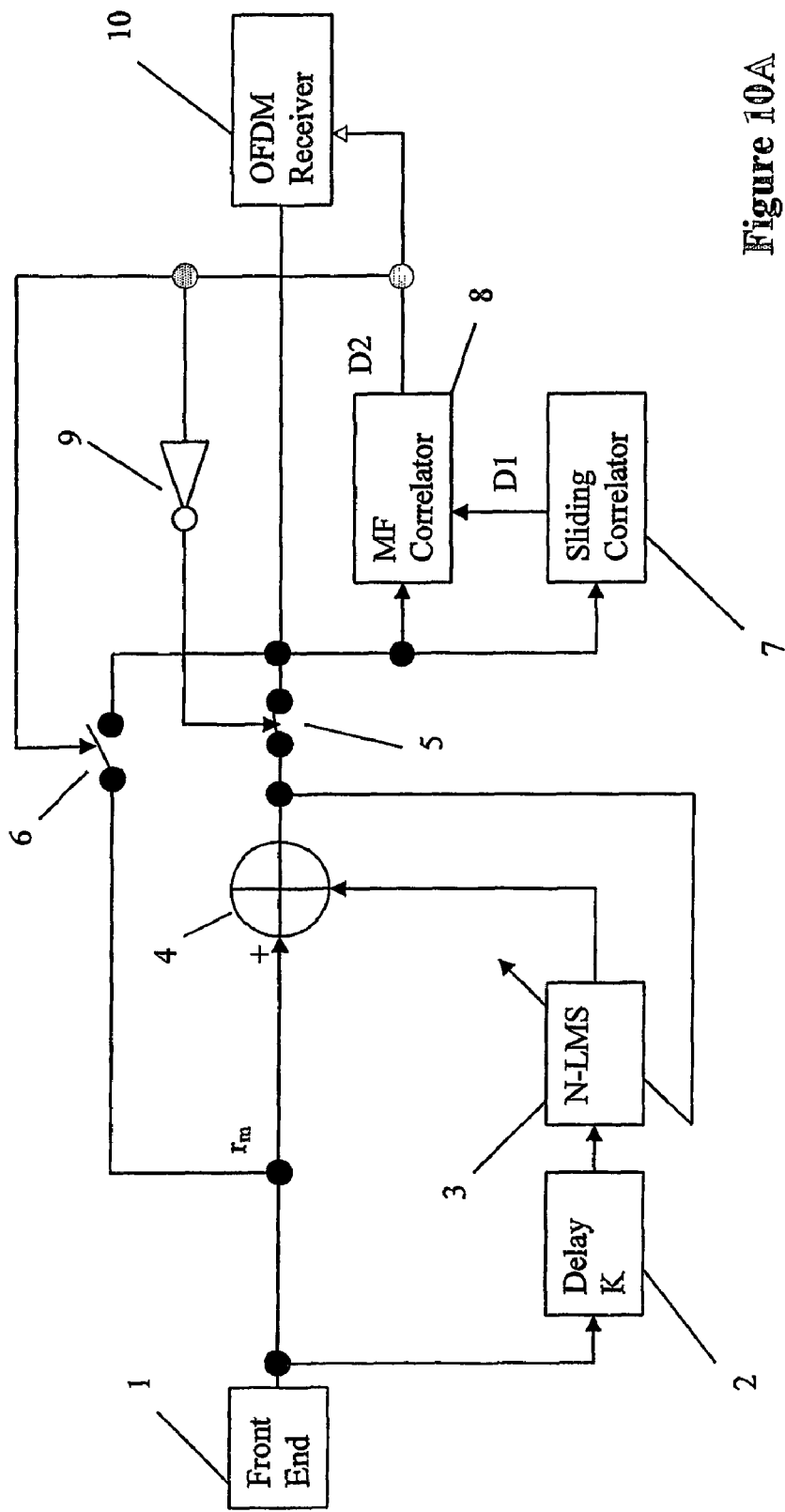
FIG. 10A is a block diagram showing the N-LMS filter in the front end of the receiver chain.
Figure 10B:
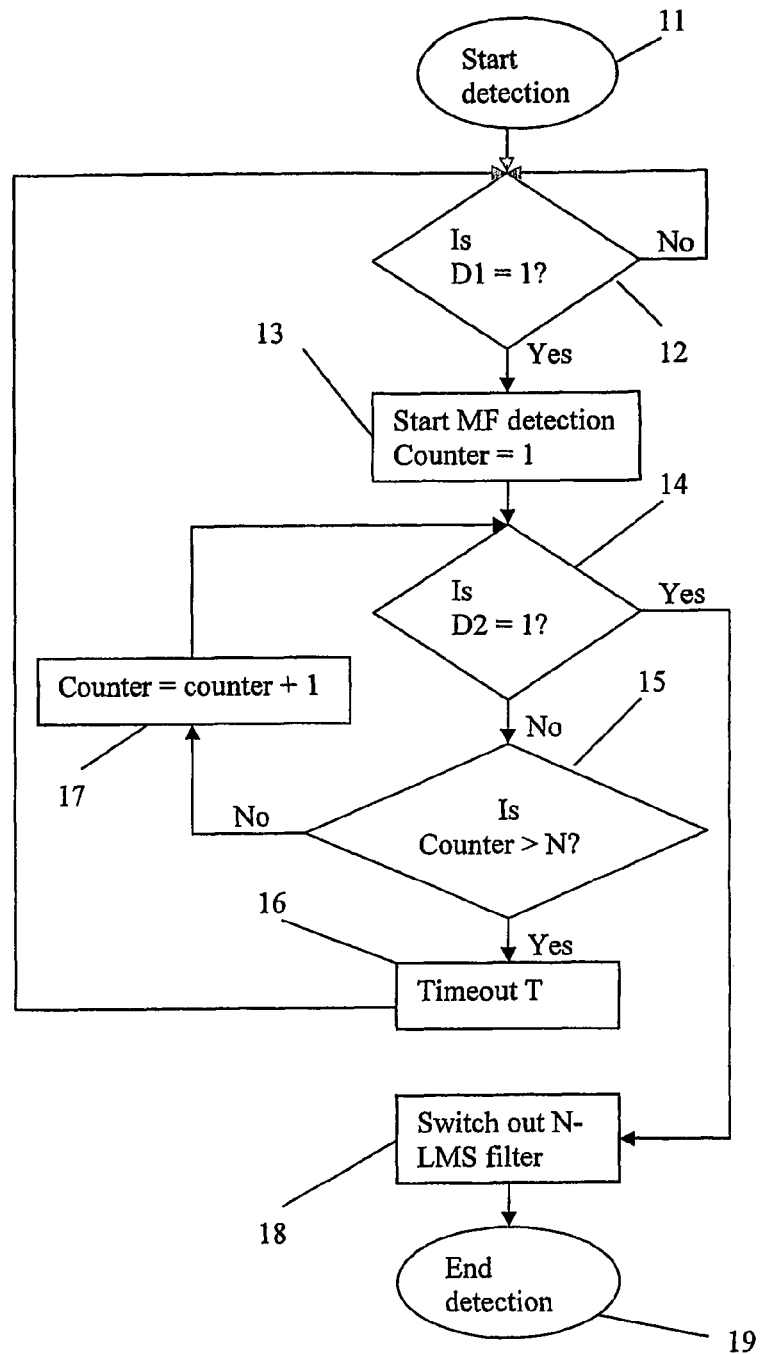
FIG. 10B is a flow chart showing the interactions between the two-stage detection process and the N-LMS filter.

A block diagram of this interference suppression system is shown in FIG. 10A, and a flowchart outlining its operation is shown in FIG. 10B. The N-LMS filter comprises blocks 2, 3 and 4 between Front End 1 and switches 5 and 6. Block 2 is a K element delay where K is an integer number of symbol periods larger than the length of the pilot symbol. As shown in FIG. 10A when switches 5 and 6 are in the position shown (closed and open respectively) the N-LMS filter is switched into the receiver. In this position the output of the N-LMS filter passes to sliding correlator 7 and matched filter correlator 8. The logic level output of the sliding window correlator enables the matched filter detector when the threshold of correlation is exceeded. This may occur for two reasons.

1. A narrowband interferer can "appear", and will produce high correlation from the sliding window correlator while the N-LMS filter adapts to suppress the interferer. This can be seen at the start of FIGS. 3D, 4D, 5D, 6D, 7D and 8D. In this case, the correlator logic output enables the matched filter detector by setting logic operator D1 to 1, but the matched filter detector will not produce a correlation peak, as there is no pilot symbol present. A state machine is provided to disable the matched filter detector after a certain number of input samples (or matched filter correlation operations) have been processed. This is shown in FIG. 10B. In FIG. 10B once detection is started the state machine flows in a loop asking whether the sliding correlator has reached a threshold value. This is shown in box 12 where the question is asked has the logic output of the sliding correlator been set. The logic output of the sliding correlator is set when the sliding correlator reaches a threshold value.

Once the logic output of the sliding correlator has been set the matched filter is operated. The matched filter correlator will exceed a threshold value if a pilot symbol is present. If the threshold is exceeded the logic operator D2 is set. Question box 14 queries whether logic operator D2 is set. If logic operator D2 is not set question box 15 queries whether the counter has exceeded a preset value (for example 10). If the counter has not exceeded the preset value the counter is incremented in box 17 and the question is again asked whether logic operator D2 is set. If the counter has exceeded the preset value the yes arrow is followed from question box 15 to box 17 where a timeout is begun.

At timeout box 17 the state machine assesses that a false correlation has occurred, disables the matched filter detector and ignores the sliding window correlator output for a "timeout period", set to be longer than the adaptation time of the N-LMS filter, say up to 1000 input sample periods. After the "timeout period" the state machine resets to the initial state and begins to query whether the sliding correlator logic operator is set.

2. A pilot symbol appears, producing a correlation peak from the sliding window correlator. Again this is shown at box 12 of FIG. 10B where when the sliding correlator produces a peak, logic operator D1 is set. The logic output of the sliding window correlator enables the matched filter detector, which will produce a correlation peak after a small number of input samples, typically five. In this operation the state machine is at box 14 where a query is run asking whether the matched filter correlator has produced a peak. The matched filter correlator produces a peak and exceeds the threshold value. This then sets logic operator D2. When operator D2 is set (before the counter is exceeded) the yes arrow is followed from box 14 to box 18 and the N-LMS filter is switched out of the receiver path. The logic output of the matched filter detector acts to remove the N-LMS filter from the receiver chain by reversing the polarity of each of the two switches 5 and 6 shown in FIG. 10A.

In this way the problem of a false packet detect caused by the N-LMS filter adapting to the interferer and the problem of ISI caused by the N-LMS filter are overcome.

Although the second detector used in the examples is a matched filter the pilot symbol detector can be any suitable detector. For example the second detector can be one or more sliding window correlators applied in series, or any correlator such as a matched filter that uses a priori knowledge of the pilot symbol in order to estimate a correlator coefficient between the received signal and the pilot symbol.

The second implementation issue is the spectral leakage, produced by large interferers, causing intercarrier interference. Simple search techniques on the pilot symbol data spectrum (FFT) will enable identification of the interference-affected bins, and appropriate measures then can be applied to post-pilot-symbol OFDM data. This can be aided by the N-LMS filter at the front end, which provides both signal-plus-noise and interference-plus-noise signals which may be used, in conjunction with the pilot symbol itself, to estimate SNR and SIR per packet.

It should be noted that interference suppression using N-LMS filter can be expected to perform equally well in either a frequency non-selective or a frequency-selective environment, as there is no assumption of desired signal spectral characteristic either explicit or implicit in the formulation of the N-LMS algorithm. It was found empirically in producing the results in the examples that an M tap N-LMS filter can be expected to perform well in suppressing M−1 narrowband interferers. The value M=3 was chosen to be able to suppress two narrowband interferers, such as may be expected from an analog cordless telephone handset and base pair. Finally, the N-LMS algorithm, being adaptive, can be expected to perform well where slow time-variation occurs either in the channel and or in the narrowband interferer signal or both.

Example 1

FIGS. 3A to 3F show results for a signal to noise ratio (SNR) of 20 dB and a signal to interferer ratio (SIR) of 15 dB. FIG. 3A shows the real part of the (unfiltered) input to the pilot symbol correlator of the first receiver, while FIG. 3B shows the real part of the output from the N-LMS filter at the input to the pilot symbol correlator of the second receiver. It can be seen that the magnitude of the first 74 μs of the unfiltered signal (shown in FIG. 3A) is slightly greater than that for the N-LMS filtered signal (shown in FIG. 3B), and that the portion of both input signals containing the pilot symbol (which occupies the next 8 μs) has a magnitude which is much larger than that of the interference plus noise signal.

FIG. 3C shows the central and non-central correlation functions evaluated in the first receiver, showing that both produce high correlation for the entire time series. The correlation for the first 74 μs represents the correlation of a narrowband interferer in AWGN, whereas correlation for the next 14 μs represents the correlation of a pilot symbol in interference plus AWGN. It can be seen from FIG. 3C that pilot symbol detection based on sliding window correlation alone is problematic in the presence of a narrowband interferer, irrespective of whether the non-central or central correlation function is used.

FIG. 3D demonstrates that the N-LMS filter has a dramatic effect on the correlation function, which appears very similar to the interference-free case. The effect of producing the N-LMS reference signal from a delayed input clearly can be seen in FIG. 3D, also. The reference signal produces a significant correlation output at around 95 µs, which is due to the pilot symbol feeding through the N-LMS filter on the reference signal.

Using the interference suppression system of FIGS. 10A and 10B when the correlation peak at about 80 µs occurs the sliding correlator activates the matched filter receiver. The matched filter receiver detects a pilot symbol and sends out a signal that results in the adaptive filter being switched out of the receiver path before the second correlation peak at about 95 µs occurs. Using the adaptive filter and logic system with the sliding correlator and matched filter correlator the narrowband interferer is suppressed and the pilot symbol correctly identified in this example.

The spectra of the signals at the input to the correlators are shown in FIG. 3E, for the unfiltered case, and FIG. 3F, for the N-LMS filtered case. The spectra were produced from the last 128 (which is 2×L) samples of the pilot symbol input into the correlators. The narrowband interferer is clearly visible at around 4 MHz in the unfiltered signal of FIG. 3E, and the effect of the N-LMS filter on the pilot symbol spectrum can be seen be examining the same part of the spectrum in FIG. 3F. These spectra show that, with an SIR of 15 dB, the interferer magnitude is about the same as the magnitude of the affected pilot symbol sub-carrier: this may be regarded as fairly modest interference.

Example 2

The effect of more severe interference can be seen in FIGS. 4A to 4F, for a single interferer with SNR of 20 dB and SIR of 0 dB. FIG. 4A shows the real part of the (unfiltered) input to the pilot symbol correlator of the receiver, while FIG. 4B shows the real part of the output form the N-LMS filter at the input to the pilot symbol correlator of the second receiver. It can be seen that the magnitude of the first 74 µs of the unfiltered signal is much greater than that for the N-LMS filtered signal, and that the portion of both input signals containing the pilot symbol (which occupies the next 8 µs) has a magnitude that is larger than that of interference plus signal noise. FIG. 4B shows that the N-LMS filter reduces the interference at the correlator input.

FIG. 4C shows the central and non-central correlation functions evaluated in the first receiver, showing that both produce high correlation for entire time series except immediately following reception of the actual pilot symbol. The correlator outputs for the unfiltered receiver can be seen from FIG. 4C to be of no value in detecting the pilot symbol for this amount of interference.

FIG. 4D shows that the filtered correlator output produces a correlation peak very similar to that expected in an interference-free environment. Again the effect of producing the N-LMS reference signal from a delayed input can clearly be seen in FIG. 4D. The reference signal produces a significant correlation output at around 95 µs, which is due to the pilot symbol feeding through the N-LMS filter on the reference signal.

As shown in FIG. 4D the sliding window correlator initially produces an output that exceeds the threshold value. At this point the matched filter correlator is started. The matched filter correlator searches for a pilot symbol. Using the interference suppression system of FIGS. 10A and 10B in each stage of the matched filter detection a counter is incremented. As there is no pilot symbol at the start of the received data the matched filter counter will exceed a predetermined value before a pilot symbol is detected. The matched filter will go into timeout mode for a predetermined period following which the sliding window correlator will resume searching for a pilot symbol. The sliding window correlator will detect the pilot symbol at about 80 µs and start the matched filter correlator again. The matched filter correlator then determines that there is a pilot symbol and sends out a signal that results in the adaptive filter being switched out of the receiver path before the second correlation peak at about 95 µs occurs. In this example the initial correlation peak detected by the sliding window correlator while it is adapting to the narrowband interferer is rejected by the interference suppression system as not containing a pilot symbol. When the pilot symbol is detected the adaptive filter is switched out of the receiver path before it can cause a false peak in the sliding window correlator. Note that in FIG. 4D if the adaptive filter remains in place, as is shown in this Figure, the second false correlation peak (at 95 µs) will not trigger the matched filter correlator as it is not larger than the threshold value.

Of additional interest is the unfiltered signal spectrum of FIG. 4E, showing "spectral leakage" from the interferer into adjacent frequency bins. This is due to the interferer not having an integral number of carrier periods in the OFDM symbol period. FIG. 4F shows that the magnitude of the interferer has been reduced by using the N-LMS filter.

Example 3

FIGS. 5A to 5F show an example having a single interferer with large SNR, 40 dB, and large SIR, 30 dB. FIG. 5A shows the real part of the (unfiltered) input to the pilot symbol correlated of the first receiver while FIG. 5B shows the real part of the output from the N-LMS filter at the input to the pilot symbol correlator of the second receiver. It can be seen that the magnitude of the first 74 µs of the unfiltered signal is greater than that for the N-LMS filtered signal, and that the portion of both input signals containing the pilot symbol (which occupies the next 8 µs) has a magnitude which is much larger than that of the interference signal plus noise signal.

FIG. 5C shows central and non-central correlation functions evaluated at the first receiver. As can be seen in FIG. 5C both correlators produce a high output when the interferer is present with no pilot symbol leading to a false packet detect. FIG. 3C demonstrates that interference-only correlation (as shown in the first 74 µs of this figure) is a function of interference-to-noise ratio alone, and that even signals having high SNR are problematic to detect in the presence of a much lower power interferer.

FIG. 5D shows the correlation when the incoming data is filtered by the N-LMS filter. Again the correlation function of the filtered data is very similar to that expected when no interferer is present. FIGS. 5E and 5F are spectra of the unfiltered and filtered signals respectively.

As shown in FIG. 5D the sliding window correlator initially produces an output that may exceed the threshold value depending on where the threshold value is set. If the threshold value is exceeded the matched filter correlator is started. The matched filter correlator searches for a pilot symbol. Using the interference suppression system of FIGS. 10A and 10B in each stage of the matched filter detection a counter is incremented. As there is no pilot symbol at the start of the received data the matched filter counter will exceed a predetermined value before a pilot symbol is detected. The matched filter will go into timeout mode for a predetermined period following which the sliding window correlator will resume searching for a pilot symbol. The sliding window correlator will detect the pilot symbol at about 80 µs and start the matched filter correlator again. The matched filter correlator then determines that there is a pilot symbol and sends out a signal that results in the adaptive filter being switched out of the receiver path before the second correlation peak at about 95 µs occurs. In this example the initial correlation peak detected by the sliding window correlator while it is adapting to the narrowband interferer is rejected by the interference suppression system as not containing a pilot symbol. When the pilot symbol is detected the adaptive filter is switched out of the receiver path before it can cause a false peak in the sliding window correlator. Note that in FIG. 5D if the adaptive filter remains in place as is shown in this Figure the second false correlation peak (at 95 µs) is probably not larger than the threshold value so will not trigger the matched filter correlator.

Example 4

FIGS. 6A to 6F show an example having a signal interferer with SNR=20 dB, SIR=15 dB and the interferer (demodulated) carrier frequency being close to DC. This situation can occur as a result of carrier feedthrough at the transmitter.

FIG. 6A shows the unfiltered received signal and FIG. 6B shows the received signal after being filtered with an N-LMS filter.

Figure 2:
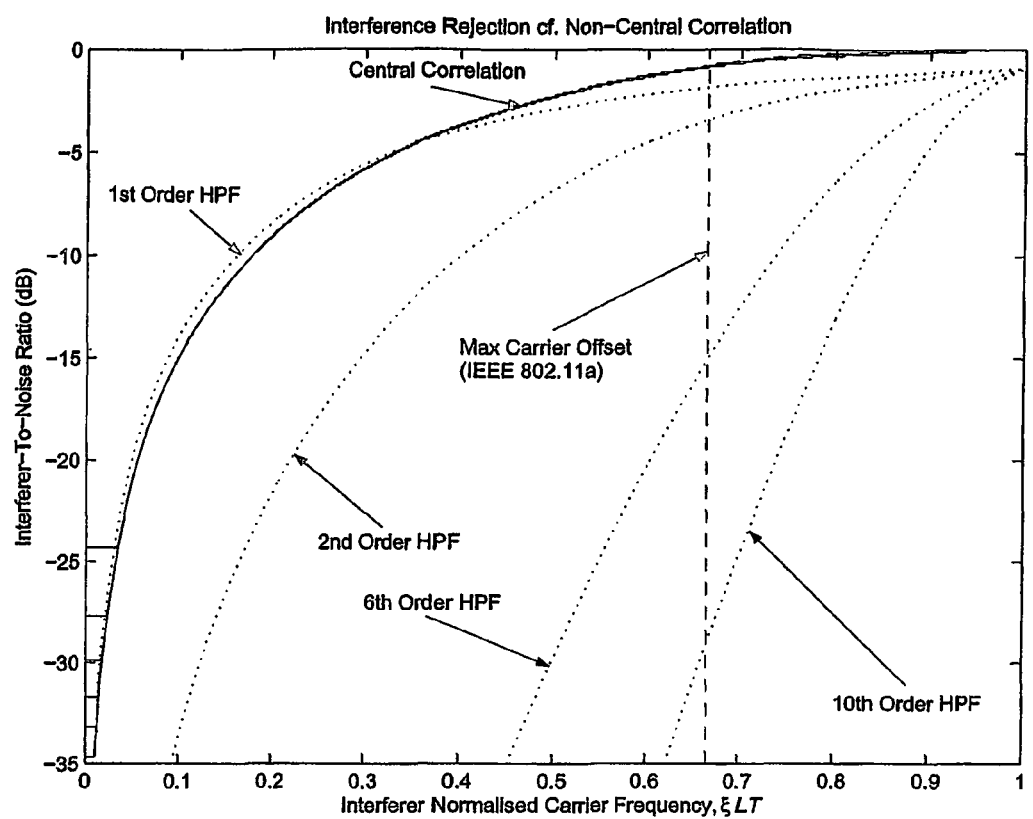
FIG. 2 shows the interference rejection where the central correlation coefficient is used as the detection metric.

FIG. 6C shows the central and non-central correlation functions applied to the unfiltered data. This figure shows that, in this case, the central correlation function, $\rho_l'$ (from equation 14), produces a lower correlation value than the non-central correlation function, $\rho_l$ (from equation 4). The normalised carrier frequency in this example is $\xi LT=0.32$ which is expected, from the theoretical development the background section and the result shown in FIG. 2, to produce a correlation attenuation of about 6 dB from using the central correlation function compared with the non-central correlation function. Casual inspection of FIG. 6C indicates that the simulation confirms this expectation. Note that the maximum normalised carrier offset (maximum carrier frequency expected as a result of carrier feedthrough) permitted by IEEE 802.11a is $\xi LT=0.67$.

FIG. 6D shows that the N-LMS filtered receiver results in better interference suppression than the unfiltered receiver employing either the central or the non-central correlation function. Again FIGS. 6E and 6F show the unfiltered and N-LMS filtered spectra respectively.

As can be seen in FIG. 6D there is an initial peak in the output of the sliding correlator as the adaptive filter adjusts and begins to filter out the narrowband interferer. Depending on where the threshold value is set this initial peak may or may not trigger the matched filter. Using the interference suppression system of FIGS. 10A and 10B if the matched filter is triggered it will set the timeout after the predetermined number of counts has been met as there is no pilot symbol. The pilot symbol will be correctly detected when it begins. In this example the false correlation peak at 95 µs is much lower than the threshold value so if the adaptive filter were left in place this would not trigger the matched filter correlator.

Example 5

FIGS. 7A to 7F show an example of two narrowband interferers, where the SNR is 20 dB and the SIRs are 10.4 dB and 9.5 dB for the two interferers.

FIG. 7A shows the unfiltered signal and FIG. 7B shows the signal after passing through an N-LMS filter. As can be seen the signal before the pilot symbol begins is reduced in FIG. 7B.

FIG. 7C shows the central and non-central correlation functions for the unfiltered signal. With the threshold set to 0.8, using either the central or the non-central correlation function will produce a false start of packet before the pilot symbol is detected. FIG. 7D shows that the N-LMS filter suppresses the two interferers to the extent that the pilot symbol correlation detection output closely resembles the interferer-free case.

As can be seen in FIG. 7D there is an initial peak in the output of the sliding correlator as the adaptive filter adjusts and begins to filter out the narrowband interferers. Depending on where the threshold value is set this initial peak may or may not trigger the matched filter. If the matched filter is triggered it will set the timeout after the predetermined number of counts has been met as there is no pilot symbol. The pilot symbol will be correctly detected when it begins. In this example the false correlation peak at 95 µs is much lower than the threshold value and if the adaptive filter were left in place this would not trigger the matched filter correlator.

FIGS. 7E and 7F show the unfiltered and N-LMS filtered spectra respectively. In particular the interferes can be seen in FIG. 7E at about 3 MHz and 7 MHz. These interferers have both been reduced in the spectrum of FIG. 7F.

Example 6

FIGS. 8A to 8F show a second example of two narrowband interferers, where the SNR is 20 dB and the SIRs are −20 dB and −10 dB for the two interferers.

Figure 8A:
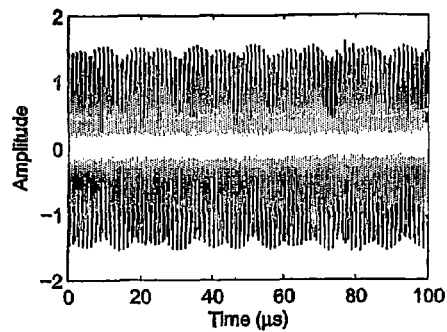
FIG. 8A shows the pilot symbol with two narrowband interferers.
Figure 8B:
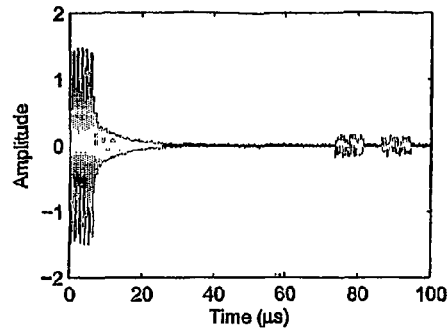
FIG. 8B shows the pilot symbol and narrowband interferers after filtering with an N-LMS filter.

FIG. 8A shows the received signal. This Figure shows that these high power interferers completely "swamp" the unfiltered receiver. FIG. 8B shows the received signal after passing through an N-LMS filter.

Figure 8C:
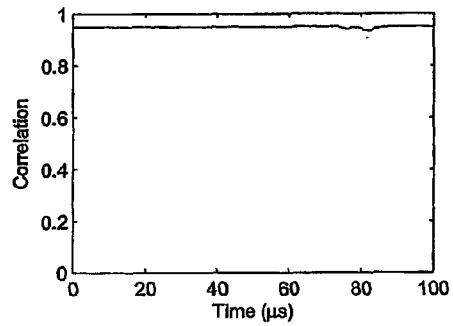
FIG. 8C shows the change in correlation coefficient over time for the signal of FIG. 8A.
Figure 8D:
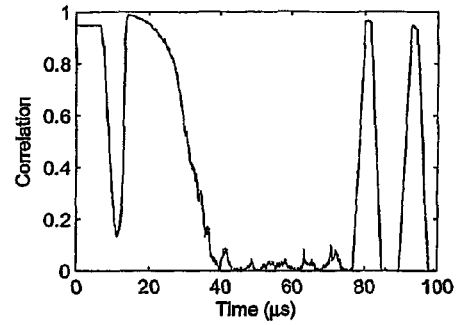
FIG. 8D shows the change in correlation coefficient over time for the signal of FIG. 8B.

FIG. 8C shows the central and non-central correlation functions for the unfiltered signal. This figure shows that the high power interferers completely swamp the unfiltered receiver. FIG. 8D shows the correlation function of the N-LMS filtered data. This figure shows that the N-LMS filtered receiver chain takes much longer to adapt and suppress the interferers in this example than in previous examples. This is due to the power differential between the two interferers, leading to the correlation matrix having widely spread eigenvalues, which means that the lower power interferer is "masked" until the higher power interferer is sufficiently suppressed. Nonetheless, the N-LMS filter suppresses the interferers to the extent that robust correlation detection can be seen in FIG. 8D. This figure also highlights that, as in FIGS. 3-7, the delayed (reference) input to the N-LMS algorithm re-injects the pilot symbol into the received signal after the K tap delay. Furthermore, in a high power interferer environment, the reference signal copy of the pilot symbol is of similar magnitude to the primary signal copy In an OFDM packet, this will have the effect of introducing significant inter-symbol interference into the OFDM data stream.

As can be seen in FIG. 8D there is an initial peak in the output of the sliding correlator as the adaptive filter adjusts and begins to filter out the narrowband interferers. Using the interference suppression system of FIGS. 10A and 10B the initial peak triggers the matched filter. The matched filter sets the timeout after the predetermined number of counts has been met as there is no pilot symbol. Following the timeout period the sliding window correlator will again detect a pilot symbol due to the second narrowband interferer. Again the matched filter will be triggered and will again timeout when a pilot symbol is not detected by the matched filter. The pilot symbol will be correctly detected when it begins at 75 μs. Once the pilot symbol is detected the adaptive filter is removed from the receiver path so that the correlation peak that would be caused by the adaptive filter at 95 μs is not present. After the adaptive filter has been removed from the receiver path normal channel estimation process can be augmented also to estimate the interferer(s), and previously proposed equalization techniques for OFDM data can be applied.

Figure 8E:
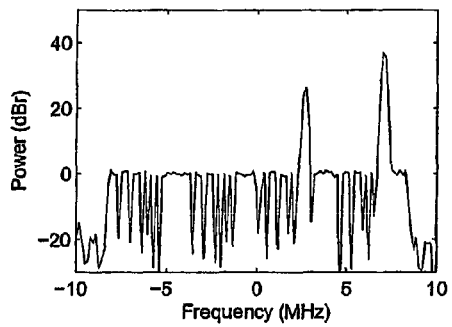
FIG. 8E is the spectrum of the last 128 samples of the received pilot symbol of FIG. 8A.
Figure 8F:
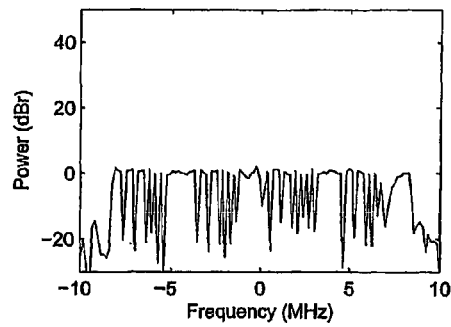
FIG. 8F is the spectrum of the last 128 samples of the received pilot symbol of FIG. 8B.

FIGS. 8E and 8F show the spectra of the unfiltered and filtered data respectively. Note that, in this example, the time domain data was windowed (using a Kaiser window with β=6) prior to performing the FFT used to produce the spectra of FIGS. 8E and 8F. This was done to reduce the spectral leakage, mentioned above, which otherwise almost completely obscures the pilot symbol data in the unfiltered signal spectrum shown in FIG. 8E.

Example 7

The operation of the matched filter is shown in FIG. 9, where both the unfiltered receiver and the N-LMS filter receiver can be seen to produce distinct matched filter peaks in FIGS. 9E and 9F, respectively. The initial peak of about 0.5 is produced by the cyclic prefix in the IEEE 802.11a long pilot symbol. The first large peak is produced by the first copy of the PRBS, and the second large peak is produced by the second copy of the PRBS in the pilot symbol. In this example, which is produced by a simulation running in non real time, the matched filter detector is exercised continuously for all data input into the receiver. In a practical receiver, the matcher filter will be enabled by a state machine triggered by the sliding window detector output exceeding the correlation threshold. In this way, the matched filter would be run, in this example, for a few samples at around 80 μs, that is, in the vicinity of the second (large) matched filter detector peak. At the point where the matched filter detector output exceeds the correlation threshold (at the second large peak) the N-LMS filter is switched out of the receiver chain—thus preventing the delayed pilot symbol (in the N-LMS filter reference channel) from appearing in subsequent OFDM data and causing intersymbol interference.

The foregoing describes the invention including preferred forms thereof. Alterations and modifications as will be obvious to those skilled in the art are intended to be incorporated in the scope hereof as defined by the accompanying claims.

The invention claimed is:

1. A method for reducing interference from at least one narrow band interferer in a pilot symbol assisted receiver comprising the steps of;
    receiving a stream of received data,
    passing the stream of received data through an adaptive filter that reduces interference from any narrowband interferer,
    passing the filtered data through a correlator arranged to detect pilot symbols,
    when a pilot symbol is detected passing the stream of received data to a receiving apparatus without first passing the received data through the adaptive filter,
    and wherein the pilot symbol has a length and includes one or more repetitions of known data or pseudo noise.

2. A method for reducing interference from at least one narrow band interferer in a pilot symbol assisted receiver as claimed in claim 1 wherein the adaptive filter has a number of taps and the number of taps in the adaptive filter is greater than a maximum number of interferers to be cancelled.

3. A method for reducing interference from at least one narrow band interferer in a pilot symbol assisted receiver as claimed in claim 1 wherein the adaptive filter uses a stream of the received data delayed by a known length as a reference signal.

4. A method for reducing interference from at least one narrow band interferer in a pilot symbol assisted receiver as claimed in claim 3 wherein the length of the delay in the delayed stream of received data is longer than the length of the pilot symbol.

5. A method for reducing interference from at least one narrow band interferer in a pilot symbol assisted receiver as claimed in claim 1 wherein the step of detecting the pilot symbol in the correlator comprises the steps of;
    detecting a peak in a sliding window correlator and,
    when the peak is detected in the sliding window correlator operating a pilot symbol detector to detect the pilot symbol.

6. A method for reducing interference from at least one narrow band interferer in a pilot symbol assisted receiver as claimed in claim 5 wherein the step of detecting a pilot symbol further comprises a step of timing out if the pilot symbol is not detected in the pilot symbol detector within a predetermined number of operations.

7. A method for reducing interference from at least one narrow band interferer in a pilot symbol assisted receiver as claimed in claim 6 wherein when the timeout occurs continuing to search for a peak with the sliding window correlator and when a peak is detected in the sliding window correlator operating the pilot symbol detector to detect the pilot symbol.

8. A method for detecting a pilot symbol in the presence of narrowband interference in a receiver comprising the steps of;
    receiving a stream of received data,
    passing the stream of received data through an adaptive filter to reduce interference from any narrowband interferers,
    passing the output of the adaptive filter to a correlator,
    when the correlator produces a peak over a threshold value triggering a pilot symbol detector to search for a pilot symbol in the filtered data,
    triggering a timeout during which the pilot symbol detector will not operate if the pilot symbol detector does not detect a pilot symbol in the filtered data within a predetermined number of operations, and
    sending a signal that triggers removal of the adaptive filter from a receiver path if the pilot symbol detector detects a pilot symbol in the filtered data within a predetermined number of second correlator operations,
    and wherein the pilot symbol includes one or more repetitions of known data or pseudo noise sequence.

9. A method for detecting a pilot symbol in the presence of narrowband interference in a receiver as claimed in claim 8 wherein the pilot symbol detector is a matched filter correlator.

10. A method for detecting a pilot symbol in the presence of narrowband interference in a receiver as claimed in claim 8 wherein a number of taps in the adaptive filter is greater than a maximum number of interferers to be cancelled.

11. A method for detecting a pilot symbol in the presence of narrowband interference in a receiver as claimed in claim 8 wherein the adaptive filter uses a delayed stream of the received data as a reference signal.

12. A narrowband interference reducing system for a receiver comprising;
    a front end arranged to receive data,
    an adaptive filter arranged to filter narrowband interference from the received data and provide filtered data, a correlator arranged to detect pilot symbols in the filtered data, and a logic system arranged to reroute the received data to a receiving apparatus without passing the received data through the adaptive filter when a pilot symbol has been detected, and wherein the pilot symbol has a length and includes one or more repetitions of known data or pseudo noise sequence.

13. A narrowband interference reducing system for a receiver as claimed in claim 12 wherein a number of taps in the adaptive filter is greater than a maximum number of interferers to be cancelled.

14. A narrowband interference reducing system for a receiver as claimed in claim 12 wherein the adaptive filter uses a delayed stream of the received data delayed by a known length as a reference signal.

15. A narrowband interference reducing system for a receiver as claimed in claim 14 wherein the length of the delay in the delayed stream of received data is longer than the length of the pilot symbol.

16. A narrowband interference reducing system for a receiver as claimed in claim 12 further comprising a matched filter correlator.

17. A narrowband interference reducing system for a receiver as claimed in claim 16 wherein when a peak is detected in a sliding window correlator operating the matched filter correlator to detect the pilot symbol.

18. A narrowband interference reducing system for a receiver as claimed in claim 17 wherein the logic system is arranged to produce a timeout if the pilot symbol is not detected in the matched filter correlator within a predetermined number of matched filter correlator operations.

19. A narrowband interference reducing system for a receiver as claimed in claim 18 wherein when a timeout occurs the sliding window correlator continues operating and when a peak is detected in the sliding window correlator the matched filter correlator begins operating.

20. A narrowband interference reducing system for a receiver as claimed in claim 19 wherein the logic system is arranged to bypass the adaptive filter by rerouting the receive data when the matched filter correlator detects a pilot symbol.

* * * * *